Figure 5:
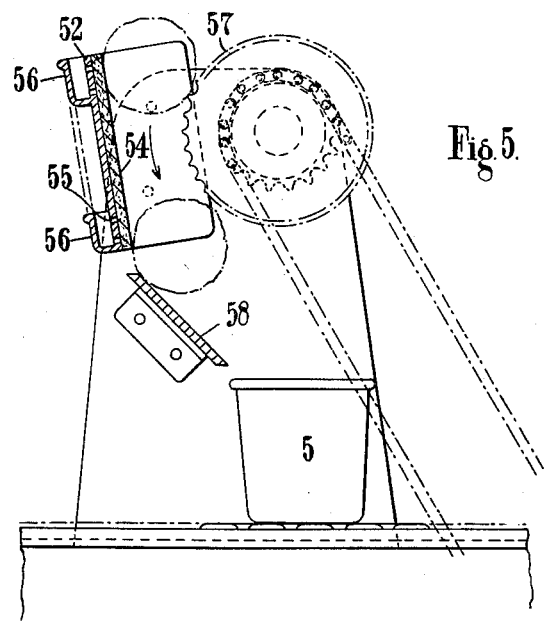

May 23, 1944. L. S. HARBER 2,349,423
MANUFACTURE OF TIN BREAD
Filed Dec. 20, 1941 5 Sheets-Sheet 1
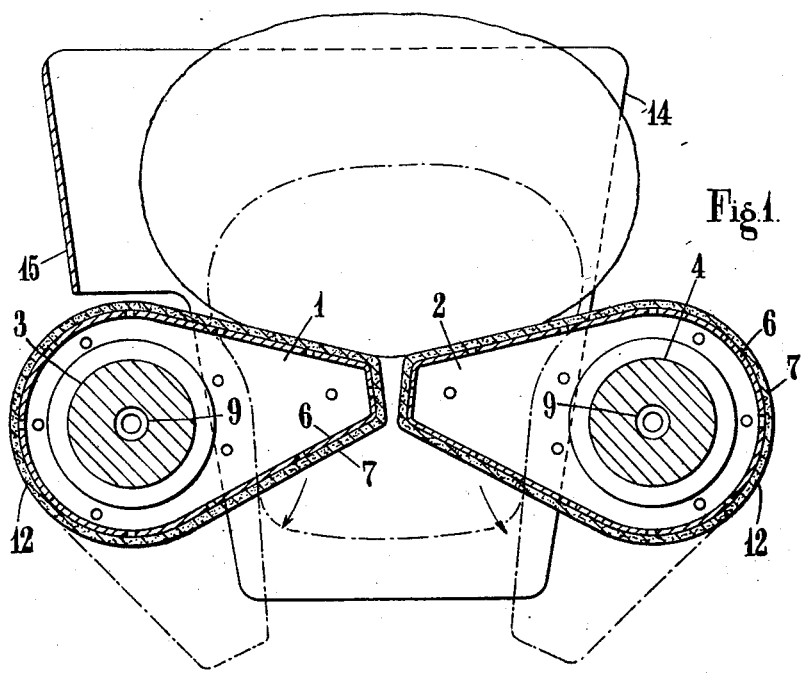
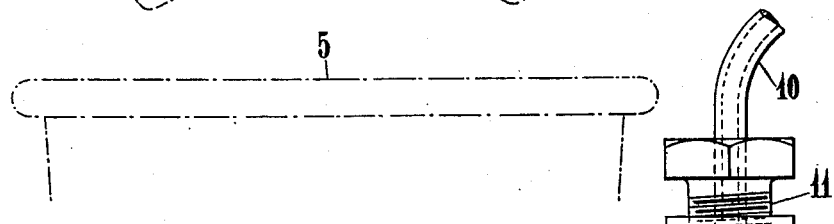
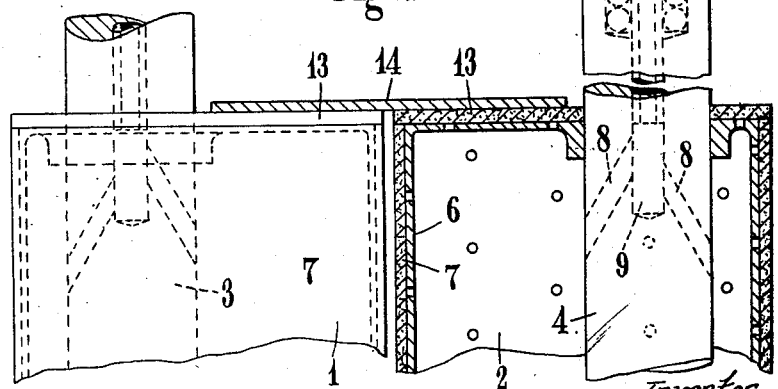
Inventor
L. S. Harber May 23, 1944. L. S. HARBER 2,349,423
MANUFACTURE OF TIN BREAD
Filed Dec. 20, 1941 5 Sheets-Sheet 2
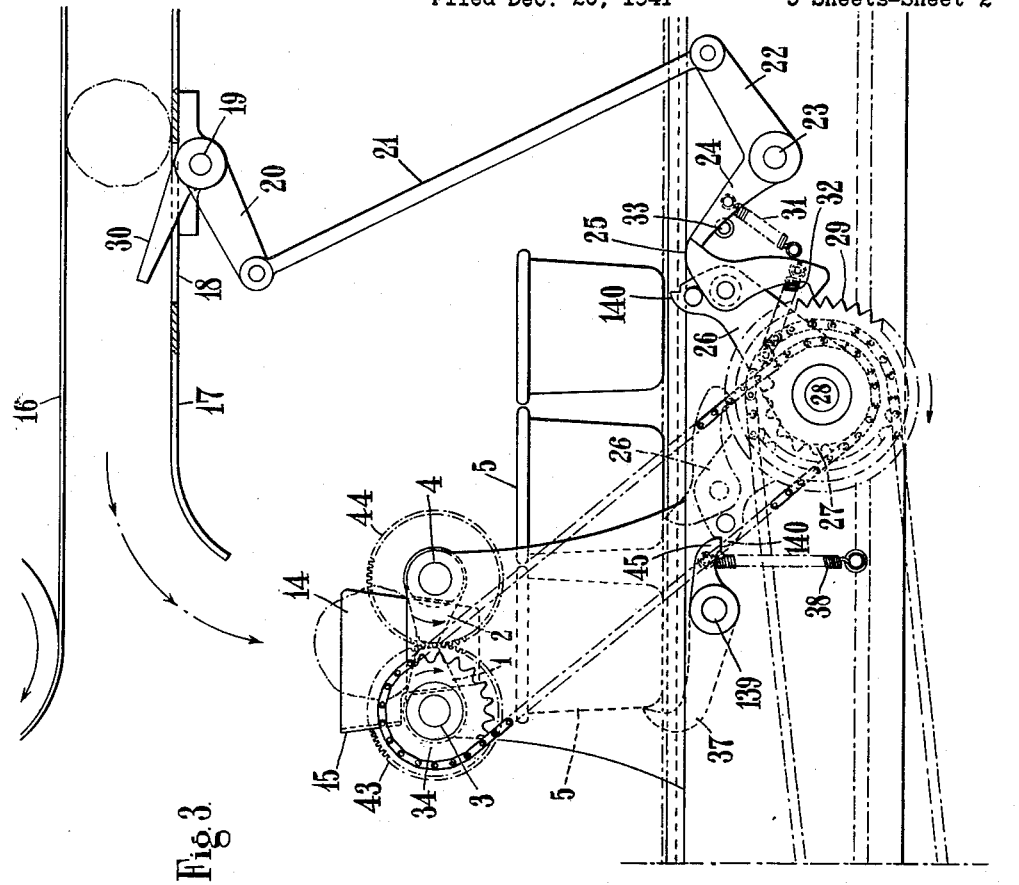
Fig.3
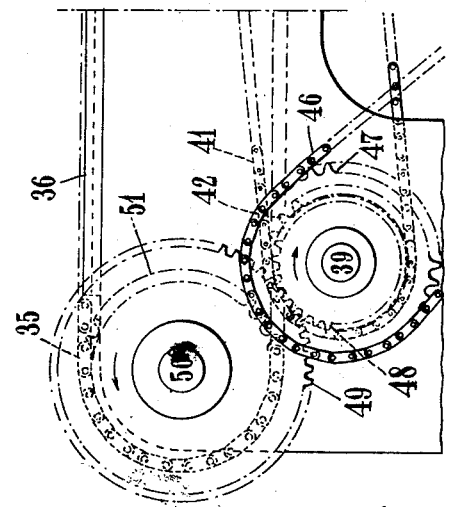
Inventor,
L. S. Harber
By: Glascock Downing & Seebold
Attys

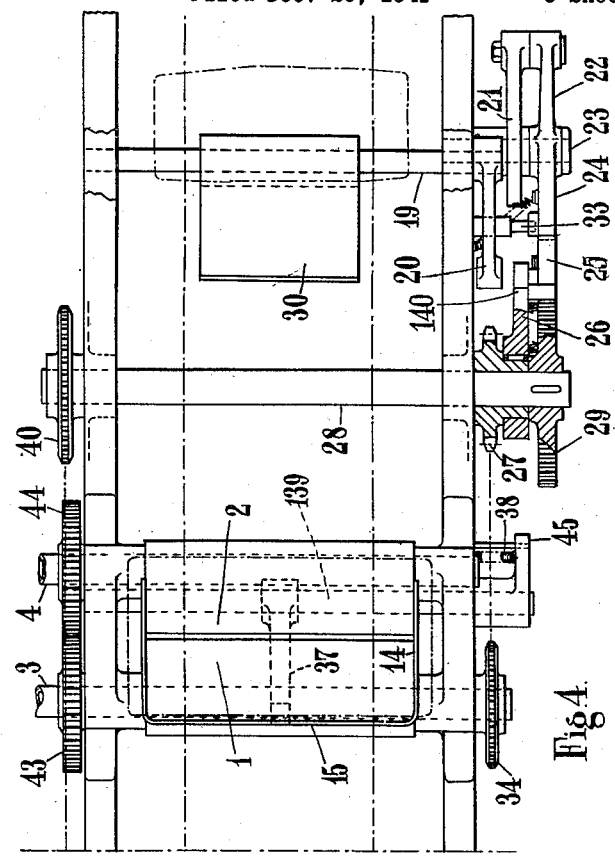
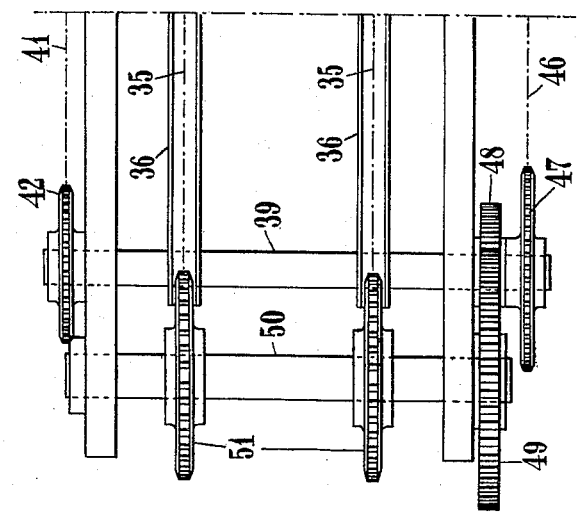
Fig. 4.

May 23, 1944.  L. S. HARBER  2,349,423
MANUFACTURE OF TIN BREAD
Filed Dec. 20, 1941  5 Sheets-Sheet 4

May 23, 1944. L. S. HARBER 2,349,423
MANUFACTURE OF TIN BREAD
Filed Dec. 20, 1941 5 Sheets-Sheet 5

Inventor,
L. S. Harber
by: Glascock Downing & Seebold
Attys.

Patented May 23, 1944

2,349,423

UNITED STATES PATENT OFFICE 2,349,423

MANUFACTURE OF TIN BREAD

Laurence Seymour Harber, Peterborough, England, assignor to Baker Perkins Limited, Peterborough, England Application December 20, 1941, Serial No. 423,847
In Great Britain January 9, 1941

4 Claims. (Cl. 107—7)

This invention relates to the manufacture of tin bread and has more particular reference to the greasing or oiling of the dough prior to its insertion in the tins.

The aim of the present invention is to provide a method and means for automatically applying grease or oil to those surfaces of the dough pieces that come into contact with the tins during baking, while maintaining that portion of each dough piece which is to form the top of the loaf, free from grease or oil.

According to the invention, dough pieces are passed, preferably immediately before they enter the tins, into contact with oil-bearing faces adapted to control the delivery of the dough pieces to the tins so that oil is transferred to the tin-contact surfaces only of the dough pieces. By "tin-contact surfaces" is meant the bottom, ends and so much of the sides of a dough piece as lies against the tin during baking (i. e. after the dough has risen and expanded).

The dough pieces may contact with the oil-bearing surfaces by being passed or pressed between rolling surfaces, or they may contact with a relative sliding movement, or they may be rolled over oil-bearing surfaces. The oil-bearing surfaces may be oil-fed or saturated with oil, or oil may from time to time be applied thereto in a thin layer by spreading means and then transferred to the dough.

According to one form of apparatus for automatically oiling dough pieces, a pair of hinged, or preferably revoluble oil-fed flaps are positioned over a tin charging station and are operated in synchronism with the tin feeding means so that in one position of the flaps a dough piece is supported while in another position it passes between the flaps into the waiting tin. Thus, in resting on the flaps, the bottom of the dough piece is oiled and as the piece passes between the flaps the sides of the dough piece have oil applied upon an area equivalent to that which will contact with the tin during the baking period.

In order to apply oil to the ends of the dough piece the flaps operate between end plates which depend below the flaps and are swept by their end surfaces, so that an oil coating is applied thereto. When the flaps open the end surfaces of the dough piece slide against the oiled end plates and thereby receive a transfer of oil from the end plates.

According to another mode, the dough piece may be rolled against an oiled side contacting surface and end contacting surfaces by a roller device so that the cylindrical wall of the dough piece rolls upon the oiled surface over a length corresponding with the arc of the dough piece which contacts with the tin in baking but leaving oil-free the top surface of the loaf.

Figure 6:
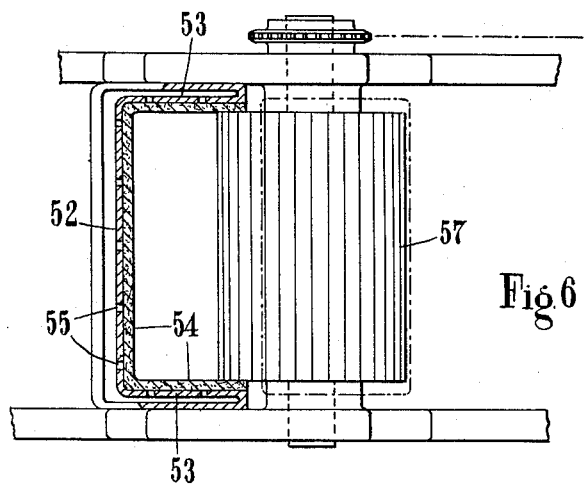
Figure 9:
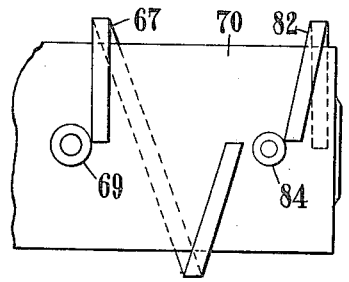
Figure 7:
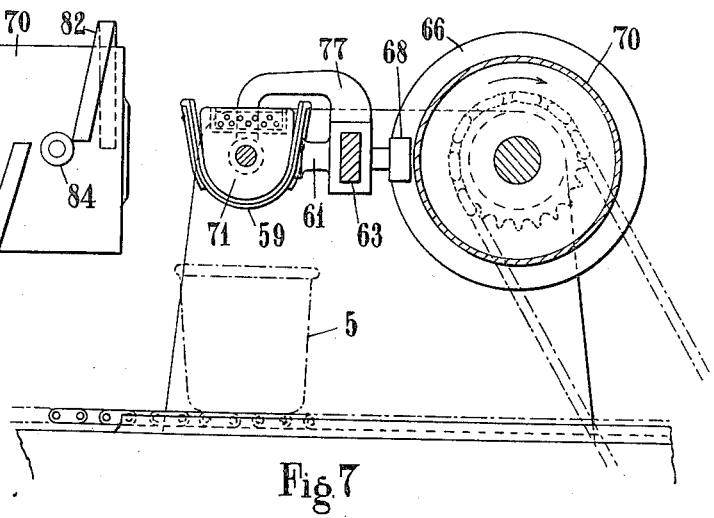
Figure 8:
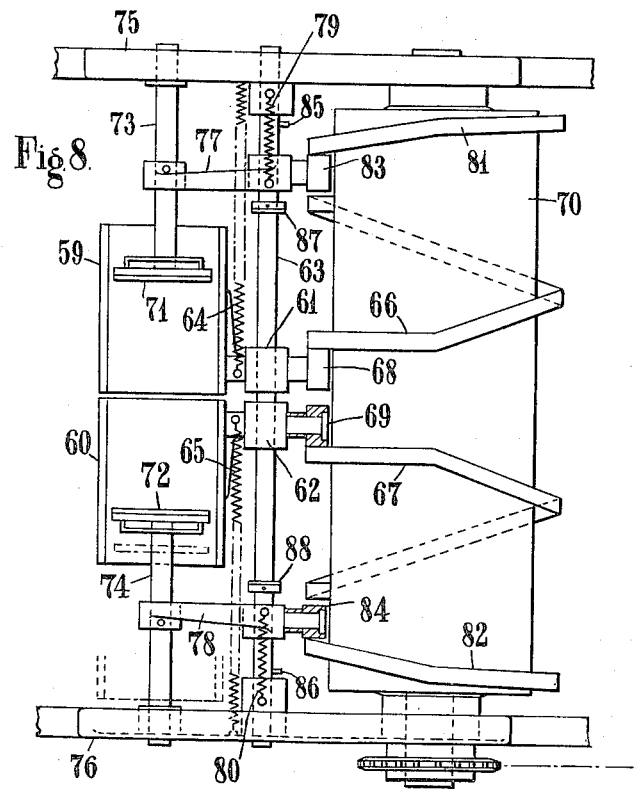

In the accompanying drawings:

Figures 1 and 2 are elevation and plan of oiling means according to one form of the invention, Figures 3 and 4 are elevation and plan showing the control of the feeding of the dough pieces to the oiling means, Figures 5 and 6 are elevation and a plan of a modified form of the oiling means, Figures 7 and 8 are elevation and plan of a further modification, Figure 9 being a detail of the cam means.

In carrying the invention into effect according to one convenient mode as described by way of example, a pair of flaps 1, 2 mounted on a hollow shaft or shafts 3, 4 having axial borings 9 therein are positioned at a tin-charging station over the position which each tin 5 is adapted to occupy for the reception of its complement of dough for baking. The flaps may conveniently be wedge-shaped in cross-section and may be made of thick felt, or they may be hollow and covered with felt. For example, they may be made of perforated sheet or thin metal 6 covered with felt 7 and fed with oil from the shafts 3, 4 through perforations or oil-ways 8 therein. The oil is supplied to these shafts by oil supply pipes 10 passing through stuffing boxes 11. Where the flaps 1, 2 are formed of pieces of thick felt appropriately shaped the oil is fed through perforations in the shafts and saturates the felt.

The flaps 1, 2 are each formed with a cylindrical rear face 12 which serves as a roller surface for engaging and pressing the dough as it is passed downwardly between the flaps.

The shafts 3, 4 are geared together by gear wheels 43, 44 (Figure 4) and given an intermittent rotation in opposite directions, the arrangement being that the dough is received on the flaps when they are stationary with their supporting surfaces in a substantially horizontal position and facing one another to form a platform. Assuming that a dough piece is on the platform and ready to be fed into a tin, the flaps commence a downward rotation, continuing through one revolution and returning to the platform forming position. The shafts 3, 4 should be spaced apart a distance such that when the flaps are open as shown in the dot and dash line in Figure 1 the throat between them is slightly less in width than the diameter of the dough pieces in order to ensure that the dough pieces make a good contact with the cylindrical rear surfaces 12 of the flaps.

At their ends the flaps 1, 2 have faces 13 which may be of felt and which are at right-angles to the axis of the shafts and these faces are adapted to distribute oil. In contact with each end face 13 of the flaps is positioned an end plate 14 which serves to guide and position the dough piece and act to apply oil to the ends of the piece as such passes into the tin 5. For this purpose the end plates are preferably made to extend substantially below the horizontal plane of the shafts of the flaps. It will be appreciated that in this position the end plates 14 are swept by the ends 13 of the flaps as they are revolved. In moving across the plates 14 the flaps apply a layer of oil thereto, which is subsequently transferred to the adjacent end of the dough piece as it passes between the flaps into the tin. The end plates 14 may be connected by a side wall 15 to ensure the dough pieces falling onto the flaps from the feeding means.

The flaps 1, 2 are operated in synchronism with means for delivering dough pieces thereto and with the movement of the train of tins for receiving the dough pieces.

According to a convenient arrangement the dough pieces are conveyed between a conveyor band 16 and a supporting board or table 17 which terminates at a position adapted to deliver the dough pieces onto the flaps 1, 2. Stepped back from the delivery end the table is provided with an aperture 18 through which a pivoted flap 30 projects into the path of the dough pieces. The flap is secured upon a shaft 19 to which a lever 20 is fixed. This lever is connected by the rod 21 to a lever 22 fixed to the shaft 23 which carries a trip lever 24. The trip lever co-operates with a pawl 25 pivoted upon a plate 26 secured to a sprocket wheel 27 which is loosely mounted upon a constantly rotating shaft 28. The shaft has secured thereto a ratchet wheel 29 with which the pawl 25 is adapted to engage whereby an intermittent drive is imparted to the sprocket wheel 27.

The release of the pawl 25 occurs each time a dough piece passes into contact with the flap 30, which causes a tripping of the trip lever 24 against the action of a spring 31. The tripping of the pawl 25 allows it to be pivoted by the spring 32 into engagement with the rotating ratchet wheel 29 whereby the plate 26 is rotated one revolution until the pawl 25 again engages the trip lever, which in the meantime has returned to its position against a stop 33, and withdraws the pawl 25 from the ratchet wheel.

The rotation of the plate 26 drives the sprocket 27 which drives a sprocket 34 secured upon the shaft 3 whereby the flaps 1, 2 are given a rotary movement to oil a dough piece already resting thereon and deliver it into the baking tin.

The tripping and driving mechanism for the flaps is also adapted to control the feeding of the tins 5 which are adapted to be held stationary beneath the flaps until the dough piece is delivered therein.

The tins 5 are adapted to be supported upon conveying sprocket chains 35 which are located in guide channels 36. The chains are constantly driven and while the tins are stationary slide beneath the tins.

The leading tin 5 is adapted to be held in the dough receiving position by a pivoted catch 37 controlled by a spring 38. The catch is mounted on a shaft 139 having an arm 45 which lies in the path of a detent 140 on the plate 26, so that at a position about 270° from the normal stationary position of the plate the detent 140 will engage the arm 45 and lower the catch 37 from the tin 5 allowing the latter to be fed along by the chains 35. When the detent has disengaged the tail piece the catch returns by the spring 38, engaging the bottom of the tin ready to rise into the path of the succeeding tin.

The shaft 28 is driven from the shaft 39 by chain and sprocket means 40, 41, 42. The shaft 39 is driven by the chain and sprocket 46, 47 from a motor (not shown). The drive for the chains 35 is taken from the shaft 39 by gearing 48, 49 and shaft 50 on which the chain sprockets 51 are mounted.

The arrangement above described may be utilised for applying oil or grease to a cylindrical or sausage-shaped piece of dough or it may be employed for oiling a plurality of adjacent pieces of dough delivered at the same time to the flaps.

The hollow shafts on which the flaps are mounted are connected through a suitable conduit to a feed pipe which may be supplied with oil under gravity action or by a forced feed device.

In operation, a dough piece falls with its longitudinal axis more or less parallel with the shafts of the flaps 1 and 2 and rests on the flaps while such are in the horizontal position. As the dough piece comes to rest upon the flaps they open downwardly so that the dough piece is deposited into the tin 5. In this downward movement the bottom and arcuate sides of the dough piece are wiped by the oiled felt surfaces while at the same time the end surfaces of the piece slide against the end plates 14 which have been previously oiled by the movement of the flaps.

It will be appreciated that as a dough piece is first deposited in a tin it lies with its under surface up to about the horizontal diametric plane, in contact with the tin walls; however, as the dough rises and expands the arcuate surface of the piece above such plane will be brought into contact with the tin, and hence it is necessary not only to apply oil over the surface of the dough piece up to the diametric plane but beyond it to a considerable extent, in order to ensure that the whole surface of the dough piece that will eventually contct with the tin during baking shall have had oil applied thereto. The operation of the flaps 1 and 2, it will be seen, does not however permit oil to be applied to that surface which will form the top crust of the loaf.

According to another mode of carrying the invention into effect a three-sided box-like structure comprising a side wall 52 and two end walls 53 is provided at the charging station for the tins 5. The end walls 53 are adapted to contact with the ends of cylindrical or like dough pieces delivered thereto while the side wall 52 of the box-like structure is intended to contact with the cylindrical surface of the dough piece. The side wall 52 is arranged vertically or at a slight angle from the vertical. The end walls and that part of the side wall against which the dough piece is to contact is covered with felt 54 and has perforations 55 through which oil may be fed to the felt. Feed pipes may be provided for supplying oil through the perforations to the felt or the walls may be provided with reservoirs 56 for oil which is adapted to seep through the perforations into the felt covering 54. Instead of upper and lower troughs as shown, the walls 52, 53 may be completely jacketed.

At the open side of the box a fluted horizontal roller 57 is mounted so that its periphery is spaced from the side wall of the box a distance that is somewhat less than the full diameter of the dough pieces to be treated. The function of the fluted roller 57 is to cause the dough piece to revolve and roll in contact with the side 52 and end walls 53 of the box-like structure. The surface of the side wall of the box-like structure that is adapted to apply oil is of a vertical extent equal to the arc of the cylinder of the dough piece it is intended to oil.

The dough pieces are delivered to the oiling device and are supported between the roller 57 and the side wall 52 of the box. The revolution of the roller 57 in synchronism with the tin-feeding mechanism feeds the dough piece downwardly, rolling it against the oiling side wall and the end walls, so that as the dough piece leaves the box-like structure its ends and its cylindrical surface are oiled over the whole tin-contacting part, leaving only the part which is to constitute the baked top crust free from oil.

A guiding surface or wall 58 is provided to direct the oiled dough piece into the tin 5, such wall being adapted for contact with the un-oiled part of the dough piece.

According to other forms of oiling device, divided trays may be employed the surfaces of which are fed or saturated with oil and which open to deposit the dough pieces. These trays may be divided longitudinally and open hingewise, or they may be divided transversely and slide open with an axial separating movement. In either case, the walls adapted to contact with the ends of the dough piece may be in the form of piston members which are moved inward to apply oil when the dough pieces are deposited in the trays. The opening of the tray deposits the oiled dough piece in the tin in waiting below.

Thus referring to Figures 7, 8 and 9 a transversely divided trough having parts 59 and 60 is provided, these parts being supported and guided by arms 61 and 62 from a rectangular section bar 63. These trough parts are adapted to be moved relatively to one another in an axial direction to open the trough and allow the dough piece to fall into the tin 5. This opening movement is effected by springs 64, 65 under the control of rotary cams 66, 67 with which rollers 68 and 69 carried by the arms 61 and 62 co-operate. The cams are mounted upon a rotary drum 70 the movement of which is synchronised with the feeding of dough pieces by means of a flap control device similar to that described with reference to Figures 1 to 4. Located within the trough parts are end members 71 and 72 in the form of reciprocable piston elements which are mounted upon rods 73, 74 sliding in the side frames 75, 76 and secured to arms 77, 78 which are mounted to slide upon the rectangular bar 63. The axial movements of the trough end members 71, 72 are effected by springs 79 and 80 under the control of cams 81 and 82 located on the drum 70, with which rollers 83 and 84 carried by the arms 77 and 78 co-operate. The arrangement of the cams 66, 67, 81 and 82 is such that there are gaps in the cam path so that when the drum in its rotation brings the gaps in the cams to the position of the rollers 68, 69, 83 and 84 the latter are released so that their springs 64, 65 and 79, 80 can operate to cause the appropriate axial movements. The disposition of the cams is such that the rollers 83 and 84 associated with the trough ends leave their cam tracks earlier than the rollers 68 and 69 so that there is first a rapid movement of the trough ends 71, 72 away from the dough piece. This movement is immediately followed by a release of the rollers 68 and 69 from the cam tracks 66 and 67 to allow the springs 64 and 65 to operate and give a rapid opening movement to the trough parts 59 and 60 whereby the dough piece is allowed to fall into the tin. The opening movement of the trough parts is followed by a closing movement which is effected by the cam track 66 and 67 pressing against the rollers to bring the trough parts together again ready for the next delivery of a dough piece. The outer movements of the trough ends 71, 72 under the action of the springs 79, 80 terminate by the abutting of the collars of the arms 77, 78 against stops 85 and 86 on the bar 63. Similarly stop members 87 and 88 are provided on the bar 63 against which the sleeves of the arms 61, 62 are adapted to abut when the trough parts are in their outer open positions. These stops 87 and 88 are provided with a cushioning means such as sorbo rubber buffers.

The trough parts 59 and 60 and the trough ends 71, 72 are all provided with a surface of felt to which oil is supplied by suitable means such as the arrangement of oil trough or jackets on the various parts. After the trough parts 59 and 60 have been closed to the position indicated in Figure 8 there is a dwell period during which the dough pieces are delivered. This dwell period is obtained by a suitable shaping of the cam tracks 66, 67 as will be observed from the plan view Figure 8.

With regard to the trough ends 71, 72 it will be appreciated that their inner or closing movement will be effected by suitable contour of the cam after the dough piece has been delivered onto the trough so as to bring the oiled felt surface of the end pieces into engagement with the dough piece when the latter has been delivered into the trough.

I claim:

1. Dough oiling and delivery apparatus comprising a pair of cooperating flaps mounted for rotation upon parallel axes, said flaps having oil bearing surfaces, dough contacting end plates between which the flaps operate, said flaps in their rotary movements sweeping over said end plates and imparting a coating of oil thereto from said oil bearing surfaces.

2. Dough oiling and delivery apparatus comprising a pair of cooperating flaps, each flap being of wedge shape in cross section and having cylindrical rear faces which serve as rolling surfaces for the dough, said flaps being mounted for rotation upon parallel axes and having oil bearing surfaces.

3. Dough oiling and delivery apparatus comprising a pair of cooperating flaps mounted for rotation upon parallel axes, each flap being wedge shape in cross section and having a cylindrical rear face concentric with the axis of rotation, said flaps having oil bearing faces, said axes being spaced apart so that said cylindrical rear faces press the dough to feed it downwardly between the flaps.

4. Dough oiling and delivery apparatus comprising a pair of cooperating flaps mounted for rotation upon parallel axes, each flap comprising a hollow element having perforated walls, a layer of felt covering the exterior surfaces of said walls, and means for delivering oil to the interior of the flaps.

LAURENCE SEYMOUR HARBER.